US006083582A

United States Patent [19]
Chen et al.

[11] Patent Number: 6,083,582
[45] Date of Patent: Jul. 4, 2000

[54] CELLULOSE FIBER BASED COMPOSITIONS AND FILM AND THE PROCESS FOR THEIR MANUFACTURE

[75] Inventors: Paul Ling Chen, Roseville; Rongsheng Roger Ruan, Arden Hills; Paul Bradley Addis; Li Xu, both of St. Paul, all of Minn.; Lun Yi, New Britain, Conn.

[73] Assignee: Regents of the University of Minnesota, Minneapolis, Minn.

[21] Appl. No.: 09/122,250

[22] Filed: Jul. 24, 1998

Related U.S. Application Data

[63] Continuation-in-part of application No. 08/748,373, Nov. 13, 1996, Pat. No. 5,817,381.

[51] Int. Cl.$^7$ .................................................. B29D 23/00
[52] U.S. Cl. ........................................... 428/34.8; 536/76
[58] Field of Search ............................... 428/34.8; 536/76

[56] References Cited

U.S. PATENT DOCUMENTS

| | | | |
|---|---|---|---|
| 3,653,925 | 4/1972 | Anker et al. | 99/166 |
| 3,660,183 | 5/1972 | Knowles | 149/21 |
| 3,664,844 | 5/1972 | Miller | 99/18 |
| 4,226,982 | 10/1980 | Blount | 536/101 |
| 4,259,147 | 3/1981 | Gordy | 162/12 |
| 4,341,807 | 7/1982 | Turbak et al. | 426/570 |
| 4,374,702 | 2/1983 | Turbak et al. | 162/100 |
| 4,378,381 | 3/1983 | Turbak et al. | 426/570 |
| 4,486,459 | 12/1984 | Thompson | 426/634 |
| 4,543,370 | 9/1985 | Porter et al. | 523/100 |
| 4,652,324 | 3/1987 | Yamashina et al. | 156/242 |
| 4,661,359 | 4/1987 | Seaborne et al. | 426/89 |
| 4,806,203 | 2/1989 | Elton | 162/19 |
| 4,810,534 | 3/1989 | Seaborne et al. | 427/384 |
| 4,915,971 | 4/1990 | Fennema et al. | 426/578 |
| 5,017,319 | 5/1991 | Shen | 264/124 |
| 5,023,103 | 6/1991 | Ramaswamy | 426/626 |
| 5,089,307 | 2/1992 | Ninoimiya et al. | 428/35.2 |
| 5,126,152 | 6/1992 | Feeney et al. | 426/102 |
| 5,147,670 | 9/1992 | Cebula et al. | 426/98 |
| 5,393,333 | 2/1995 | Trouve | 106/149 |
| 5,503,996 | 4/1996 | Torget et al. | 435/105 |
| 5,529,663 | 6/1996 | Springer | 162/76 |
| 5,643,359 | 7/1997 | Soroushian | 106/805 |

FOREIGN PATENT DOCUMENTS

| | | |
|---|---|---|
| 9005762 | 6/1996 | Brazil . |
| 09071677 | 3/1997 | Japan . |
| 09195194 | 7/1997 | Japan . |

OTHER PUBLICATIONS

"Commercially–Viable Edible Coatings Face Several Challenges", *Emerging Food R&D Report*, 1, (Jun., 1994).
"Consider Edible Collagen Film for Packaging", *Emerging Food R&D Report*, 1, (Oct. 1, 1995).
"Executives ... FYI", *Emerging Food R&D Report*, 6(6), 1, (Sep. 1, 1995).
"Precut Produce Sales to Soar—Edible Coating has Wide Application", *Food Institute Report*, 68(47), 1, (1995).

Debeaufort, F., et al., "Effect of surfactants and drying rate on barrier properties of emulsified edible films", *International Journal of Food Science and Technology*, 30, 183–190, (1995).
Falk, S., et al., "On the relation between Turgor pressure and tissue rigidity. I. Experiments on resonance frequency and tissue rigidity", *Physiologia Plantarum*, 11, 802–837, (1958).
Forcinio, H., "Extending Frshness and Shelf Life", *Prepared Foods*, 163(12), 87–90, (1994).
Frey–Wyssling, A., "Deformation of Plant Cell Walls", *In: Deformation and Flow in Biological Systems*, Edited by A. Frey–Wyssling, North–Holland Publishing Company, publishers, 194–254, (1952).
Gennadios, A., et al., "Edible films and coatings from wheat and corn proteins", *Food Technology*, 63–69, (Oct. 1990).
Goddard, R., "Now You Can Have Your Pack and Eat It", *Packaging Week*, 10(22), 28–29, (1994).
Kester, J.J., et al., "Edible films and coatings: a review", *Food Technology*, 47–59, (1986).
Krassig, H.A., "Cellulose: Structure, Accessibility and Reactivity", *Polymer Monographs*, (11), Gordon and Breach, publishers, (1993).
Krochta, J., et al., "Edible Coatings and Films to Improve Food Quality", *Food Trade Review*, 64(11), 753, (1994).
Long, A., "Ingredients and Coatings", *Frozen and Chilled Foods*, 48(2), 14, (1994).
Mohsenin, N.N., "Physical Properties of Plant and Animal Materials", *Chapter 2; Structure and Chemical Composition and Chapter 4: Some Basic Concepts of Rheology*, Gordon and Breach, publishers, 22–54; 128–223, (1986).
Morton–Jones, D.H., "Polymer Processing", Chapman and Hall, publishers, (1989).
Park, H.J., et al., "Permeability and mechanical properties of cellulose–based edible films", *Journal of Food Science*, 58(6), 1361–1364, (1993).
Park, J.W., et al., "Fatty Acid concentration effect on tensile strength, elongation, and water vapor permeability of laminated edible films", *Journal of Food Science*, 59 (4), 916–919, (1994).

(List continued on next page.)

*Primary Examiner*—Paul R. Michl
*Attorney, Agent, or Firm*—Schwegman, Lundberg, Woessner & Kluth, P.A.

[57] ABSTRACT

A process and materials are described in which highly refined cellulose fibers are broken down into microfibers and further processed into compositions, films, coatings and solid materials which are biodegradable and even edible. The process for the formation of hardenable compositions may comprise providing a composition comprising highly refined non-wood cellulose fiber, mechanically reducing the size of the non-wood cellulose fiber to less than 2 mm, reducing the amount of binding of microfibers by lignin within said non-wood cellulose fibers present in said composition comprising cellulose fiber to form a first fiber product, providing pressure of at least 300 psi to said first fiber product while it is in the presence of a liquid, and removing said pressure within a time interval which will cause said cellulose fiber to break down into a second fiber product comprising microfibers in said liquid.

7 Claims, No Drawings

OTHER PUBLICATIONS

Parrott, M.E., et al., "Functional properties of various fibers: physical properties", *Journal of Food Science,* 43, 759–766, (1978).

Pryor, M.G., "The Rheology of Muscle", *In: Deformation and Flow in Biological Systems,* Edited by A. Frey–Wyssling, North–Holland Publishing Company, publishers, 157–193, (1952).

Rice, J., "Consuming Demands: Gas Packanging, source–reduction and reclosable stand–up pouches help meet new consumer needs", *Food Processing,* 71–72, (Jan., 1996).

Ruan, R., et al., "Structure–function relationships of highly refined cellulose made from agricultural fibrous residues", *Applied Engineering in Agriculture,* 12(4), 465–468, (1996).

Turbak, A.F., et al., "Microfibrillated cellulose, a new cellulose product: Properties, uses and commercial potential", *Journal of Applied Polymer Science: Applied Polymer Symposium 37,* 815–827, (1983).

CELLULOSE FIBER BASED COMPOSITIONS AND FILM AND THE PROCESS FOR THEIR MANUFACTURE

This application is a CIP of Ser. No. 08/748,373, filed Nov. 13, 1996, now U.S. Pat. No. 5,817,381.

BACKGROUND OF THE INVENTION

1. Field of the Invention

The present invention relates to the manufacture of fibers, compositions, products and films from cellulose fiber material, the process for manufacturing these fibers, compositions, products and films and products obtained.

2. Background of the Art

Each year, farming and agricultural processing industries generate millions of tons of by-products. In Minnesota and other Midwestern states, for example, where corn, soybean and sugar beets are the major agricultural crops, producers and processors are facing serious problems in dealing with the large amounts of processing by-products such as sweet corn cobs and husks, soybean hulls, and sugar beet pulps. Some of the by-products are used for land application. Animal feed processing industries consume only a small portion of these by-products, much of these by-products cannot be utilized and hence become wastes, which have to be disposed of at great expense to producers and processors. This situation has significant negative impact on the development of farming and agricultural processing industries as well as the environment. It would be advantageous for the growers, processors, and the environment, if the by-products could be utilized on-site or elsewhere.

The benefits of utilizing agricultural fibrous by-products are two fold. First, value is added to the products and hence to the farming and agricultural processing industries, and second, the products could be 100% biodegradable and free of materials which would persistently and adversely affect the environment. The products would therefore be environmentally friendly. However, lack of technology suitable for processing agricultural by-products into value-added products has been the major obstacle to the utilization of these materials.

There are growing interests expressed by crop growers and processors as well as consumers in 100% biodegradable materials made from agricultural and food industrial by-products. To utilize the by-products generated from agricultural and food industries, new technology is required.

Agricultural growers and food processors will certainly benefit from utilization of their by-products in at least two ways. First, they will gain profit from selling the commodities made from the by-products, such as sweet and yellow dent corn cobs and husks, soy hulls, and sugar beet pulps. Second, the ever increasing cost spent on disposal of the processing by-products, such as sweet corn cobs and husks, oat fibers, soy hulls, and sugar beet pulps, will be greatly reduced. Utilization of agricultural and food industry by-products will have significant impact on our environment. First, the amount of by-products disposed of will be largely reduced. Second, the products made from these by-products are expected to be 100% biodegradable and hence environmentally friendly. Biodegradable products are always welcome and demanded. For example, 100% biodegradable and environmentally friendly materials are strongly demanded by governmental agencies. The U.S. Navy is seeking materials that are 100% biodegradable to make cutlery, dishes, plates and containers, which can be disposed into the seas after use without causing long term pollution.

Many of the food and agricultural byproducts contain substantial amount of cellulosic fibers. Cellulose is the most abundant organic material on earth, and the most important basic molecular unit of plant fibers whose mechanical properties reflect the mechanical characteristics of the plant tissues (Falk, S., Hertz, C. H. and Virgin, H. I. 1958. *Physiol. Planetarium* 11:802; Frey-Wyssling, A. 1952. *Deformation and flow in biological systems*. Interscience Publishers, Inc. New York.; Parrott, M. E. and Thrall, B. R. 1978. *J. Food Sci.* 43:759.). Cellulose has presented its great usefulness in chemical, chemical engineering, paper making, textile, material and food industries over the years. The major challenge these industries are facing is to find ways to extract cellulose from natural materials or synthesize cellulose from chemicals, and to invent methods to make the cellulose into functional products.

Morphologically, plant fibers are formed by fibrils that are composed of microfibrils. Therefore, the microfibrils, bundles of cellulose chains, are the real morphological units of plant material (Mohesinin, N. N. 1986. *Physical properties of plant and animal materials*. Gorden and Breach Science Publications. New York). Microfibrils display a number of physical and chemical properties associated with strong mechanical strength and chemical inertness (Krassig, H. A. 1993. *Cellulose: Structure, accessibility and reactivity*. Yverdon, Switzerland.). Microfibrillation of crude fibers through high pressure shearing renders a much stronger mechanical strength to the microfibrillated materials. Many agricultural crops, although composed largely of fibers, appear to have a loose structure and soft texture. When beaten or refined by traditional chemical and mechanical processes, they tend to produce pulp that has low mechanical strength when made into paper and fiberboard. Microfibrillation would be one of the solutions to make mechanically strong and chemically inert materials from fiber-rich food and agricultural by-products.

A process of making microfibrillated cellulose (MFC) from wood pulp was reported by Turbak, A. F., Snyder, F. W. and Sandberg, K. R. 1983a, Turbak, A. F., Snyder, F. W. and Sandberg, K. R. 1983b, U.S. Pat. No. 4,374,702, Turbak, A. F., Snyder, F. W. and Sandberg, K. R. 1983c. *J. Appl. Polymer Sci. symposium No.*37., 815; Turbak, A. F., Snyder, F. W. and Sandberg, K. R. 1983c. U.S. Pat. No. 4,341,807; Turbak, A. F., Snyder, F. W. and Sandberg, K. R. 1984. U.S. Pat. No. 4,452,721. (What format for listing cited literature?). The potential applications of MFC in foods, paints, pharmaceuticals and cosmetic products have been recognized (Turbak et al., supra), but there has been no recognition of the potential for structural materials, including self supporting films, wrapping materials, and structural support members (e.g., structural ribs, beams, etc.). Moreover, MFC is not commercially available.

The process described by Turbak et al. (U.S. Pat. No. 4,374,702) for preparation of MFC from wood pulp basically involved a homogenization operation, during which wood pulp was repeatedly passed through a high pressure homogenizer until the suspension becomes a substantially stable dispersion. The homogenizer had a small diameter orifice in which the suspension was subjected to a pressure drop of at least 2000 psi and a high velocity decelerating impact against a solid surface. Homogenization is a very efficient process that converts the fibers into microfibrillated cellulose without substantial chemical change of the starting material. Finely divided cellulose is also produced in traditional processes used in manufacturing mechanical pulp, fiberboard and paper pulp. However, these traditional processes involve the use of additional chemical treatment to available cellulose pulps, as for example, acid hydrolysis or mercerization, which chemically alter or degrade the prepared cellulose pulps. In the paper industry, it is well known that paper strength is directly related to the amount of beating or refining which the fibers receive prior to formation. However, beating and refining as practiced in the paper industry are relatively inefficient processes since large amounts of energy are expended to gain relatively minor amounts of fiber opening fibrillation.

The process of U.S. Pat. No. 4,374,702 used wood pulp as a starting material. To be able to process agricultural by-products, additional steps prior to homogenization have been shown to be required (Ruan, R., Y. Lun, J. Zhang, P. Addis, and P. Chen. 1996. Structure-Function Relationships of Highly Refined Cellulose Made from Agricultural Fibrous Residues. *Applied Engineering in Agriculture.* 12(4):465–468.). The properties of the cellulosic products made from non-wood materials, which may differ from those of the products made from wood materials should be understood.

Edible or Biodegradable Packaging Materials—Films and Coatings

Ordinary food packages use metal, glass, plastic, foil and wax board containers for protection against external contamination, the effects of atmospheric oxygen and moisture, and for protection against mechanical damage. The food is removed or separated from the package at the time of use. In contrast, when package, in the form of film or coating, is an integral part of the food and consumed as such, the package is classified as soluble or edible. The most familiar example of edible packaging is sausage meat in casing that is not removed for cooking and eating. Other examples will be given later.

The primary purpose of packaging in general is to retard undesirable migration of moisture, grease or oil, and gaseous components (oxygen, $CO_2$, volatile flavors), prevent the food from microbial invasion, mechanical damage and breakage, and isolate reactive ingredients. Additional benefits from edible packaging materials as opposed to ordinary packaging materials are summarized as follows they are edible, their cost is generally low, their use could reduce waste because, they are part of integrated foods, and biodegradable, they can enhance the organoleptic, mechanical, and nutritional properties of foods they are suitable of wrapping of small pieces or portions of food, they can be used inside a heterogeneous food, providing a barrier between components.

These additional benefits, together with the following factors have stimulated the interest in edible packaging:

environmental legislation, expanding distribution channels, consumer expectations for a variety of fresh foods, need for extended shelf life foods, opportunities for new foods with edible barriers.

Examples of applications of edible packaging in food and other products are given in Table 1. The functions of edible packaging are also demonstrated through these examples.

TABLE 1

Examples of Applications of Edible Packaging in Food and other Industries

| Products | Use and Functions of Edible Packaging |
| --- | --- |
| Fresh produce | coating - retard moisture transmission, provide protection from mechanical damage, naturally regulate oxygen and carbon dioxide condition to control respiration |
| Dried fruits | coating and wrapping - maintain desirable moisture content, prevent stickiness and clumping |
| Dried nuts | coating - serve as barrier to oxygen and water to prevent oxidation and moisture absorption, bind flavors, salts, spices, colors and antioxidants |
| Meat and fish | wrapping and coating - prevent oxidation, moisture loss and contamination, maintain freshness |
| Cereal foods | coating - prevent moisture migration from one component (i.e. raisins) to other component (i.e. corn flakes), carry flavors |
| Bakery foods | coating - inhibit moisture penetration and oxidative deterioration, |
| Confectionery | coating and wrapping - prevent stickiness and clumping, inhibit oil migration, |
| Powders | encapsulation - prevent caking |
| Pharmaceuticals | macro- and micro-encapsulation - prevent moisture absorption and oxidation, allow controlled release |
| Flavors | encapsulation - prevent gas exchange, inhibit evaporation and oxidation, allow controlled release |

Edible films and coatings can be divided into several groups depending on the components that form the main matrix of the edible materials, namely, (1)lipid-based, (2)protein-based, (3)carbohydrate-based, and (4) composite films and coatings. The most important properties of edible films and coatings are the water vapor permeability (WVP) and mechanical properties, namely tensile strength, puncture strength, and flexibility. Each of the edible packaging materials mentioned above has unique properties that are governed by its composition and manufacturing conditions it experienced. For example, lipid-based films have low WVP and mechanical strength, while the protein- and carbohydrate-based films are strong but have higher WVP. Composite films, which may compose of proteins and lipids or mixture of carbohydrates and lipids, have a lower WVP than protein- and carbohydrate-based films and a stronger mechanical strength than lipid-based films. Composite films can be further divided into two types based on the structural relationship between the lipids and the hydrophilic components (proteins and polysaccharides). These two types are namely laminated or bilayer films, in which the lipid is a distinct layer within the films, and emulsified films, in which the lipid is uniformly dispersed throughout the films. The preparation of bilayer films involves four stages: two coating and two drying stages. This is the reason why bilayer films are not popular in food industry although they are good moisture barriers (Debeaufort and Voilley, 1995).

Edible plasticizers are normally incorporated into edible films and coatings to improve the flexibility, machinability and applicability of the edible films and coatings. The mostly used and most suitable plasticizer is glycerol because its edible, water-soluble, polar, nonvolatile, and protein and cellulose miscible nature. The materials of the present invention may also be used effectively as coating compositions (which are biodegradable and even nutritional) for seeds. Individual seeds or small packets of seeds may be coated or bound by the compositions of the present invention. These compositions are able to provide protective coatings that can reduce effects of ambient moisture, dry conditions, pests, mold, fungi and the like. The coating composition may contain repellant additives, fertilization enhancing compounds, and the like. The properties of the coating may be controlled so that modest amounts of moisture will not cause the seeds to germinate, but that normal soaking as occurs in wet fields will allow the seeds to germinate after the coating dissolves or is dispersed. Fertilizer or other plant nutrients specific to the desired seed may be added to the coating to enhance its utility.

100% Biodegradable Molded Articles

Cellulose is a polymer made by plants. Processing of plant cellulose-based polymers into products is a new field, and no references can be found in the scientific literature. However, looking into the techniques for synthetic polymer or plastic processing would be a good starting point.

Molding including injection molding and compression molding is the most common method to produce plastic products from polymers. Both methods are well reviewed and compared by Tucker (1987) and Morton-Jones (1989) (Tucker III, C. L. 1987. In Injection molding and compression molding fundamentals. ed. by A. I. Isayev, pp481. Marcel Dekker, Inc., New York.; and Morton-Jones, D. H. 1989. Polymer Processing. Chapman and Hall, London). Injection molding is characterized by ease of material handling and automation, high production rates and accurately sized products compared to compression molding. However, in cases where the materials possess certain properties which would not work well with injection molding, or injection molded products would not meet the requirements, compression molding becomes a favorable choice.

Compression molding is the oldest mass production process for processing polymers. It is almost exclusively used for thermosets. Compression molding is relatively simple with little scrap produced and low orientation in the moldings, as compared with injection molding. The low orientation feature gives compression molded products many advantages compared to those made using injection molding: (1) fibrous fillers are well distributed and are not disturbed or orientated during processing; (2) the product has low residual stresses; (3) mechanical and electrical properties are retained because there is little shearing flow to cause tracts; (4) mold maintenance is low; and (5) capital and tooling costs are relatively low. Besides, compression molding flows involve modest amounts of deformation, and there are no regions of very high stress, such as at the gate of an injection mold. Consequently, reinforcing fibers are not damaged by the flow during mold filling as often happens in injection molding. Thus, higher concentrations of reinforcing fibers and longer fibers can be included in compression molded materials. There are several stages in the compression molding: (1) positioning of the mold; (2) material preparation; (3) prefill heating; (4) mold filling; (5) pressing; (6) in-mold curing; and finally (7) part removal and cool-down. Recent work in compression molding has focused on the critical issues of mechanical property control, surface finish, cycle time, mold design, and process automation. For compression molding of plant cellulose based polymers containing moisture, new problems will be encountered. A major challenge will come from the design of the mold that allows escape of water during molding and accurate control of the size of the final products. There is no doubt that modified processing procedures and molds can be developed to deal with the particular properties of HRC.

Injection molding will face similar modifications to work optimally with HRC. For injection molding, the flow properties and behaviors of polymers are extremely complex and influential on the process, which are influenced not only by the type of polymeric materials but also the geometrical design of the mold, variables concerning injection, filling, packing and holding. One should realize that in general, plant cellulose based polymeric materials have poor thermal plastic properties, and do not flow well during the molding process, which limits the use of injection molding for processing of this type of material.

Blending in the injection molding process has been used to produce products with new properties. The flow and mechanical properties of a polymer may be improved by blending with other polymer(s). Introduction of synthetic polymers into starch is to impart desirable physical properties, and produce commodities with higher biodegradability. Taking a similar approach, it is possible to blend biodegradable thermal plastic polymers such as polycaprolactone (PCL, a fully biodegradable polyester, polyvinyl alcohol, etc.) into plant cellulose based polymeric materials to improve the performance when subjected to injection molding.

Natural Ingredients for Food, Pharmaceutical and Cosmetic Industries

Cellulose based food ingredients have been used as functional components in foods and pharmaceuticals. A summary of applications of cellulose based food ingredients is presented in Table 2.

TABLE 2

Summary of Functions and Applications of Cellulose Based Food Ingredients

| Functions | Sample Food Systems |
| --- | --- |
| Thickening | sauces, salad dressing, gravies, processed meats, |
| Bulking agent | bakery, confectionery, |
| Emulsion Stabilization Fat Substitute | ice cream, salad dressing, sauce, bakery, gravies |
| Foam Stability and Syneresis Control | whipped and aerated foods, fillings, |
| Ice Crystal Control and Texture Modification | frozen dessert, sorbets, dairy products |
| Heat Stabilization | bakery jellies |
| Suspension of Solid | soft drinks |
| Water and Fat retention aids | bakery, processed meat, frozen dessert, |
| Edible Film and Coating | dried solid foods, instant drinks (tea and coffee), encapsulation of flavor, pharmaceuticals, |
| Dietary Fiber Supplement and Bulking Agent | bakery, processed meat, confectionery, |

It can be seen that cellulose based ingredients have a wide range of applications in foods. They are also receiving increasing attentions from pharmaceutical and cosmetic industries.

Until the present invention, there is no process reported by other researchers for processing of non-wood fibers such as food and agricultural fibrous byproducts, nor the concepts and methods for use of the compositions derived from food and agricultural fibrous byproducts. The present invention develops processes to convert food and agricultural fibrous byproducts into materials having various compositions. It is also an aspect of the present invention to develop concepts and methods to utilize these materials.

SUMMARY OF THE INVENTION

The present invention relates to a process for converting cellulose fiber, and especially non-wood cellulose fiber, into compositions which can be used to form self-supporting films, coating compositions, wrapping materials, and structural support members. By appropriate selection of additives, the films, compositions and articles produced from the process can be 100% biodegradable and even edible.

The fundamental process comprises the steps of providing a source of cellulosic fiber, reducing the size of the cellulosic fiber, preferably treating the cellulosic fiber to reduce or remove lignin present with the fiber, adding liquid or flowable material into the fiber mass, combining the fiber with the liquid under pressure (e.g., homogenization under pressure), rapidly reducing the pressure on the combined fiber/liquid mass to microfibrillate the fiber, and drying the resultant microfiber composition.

The liquid which may be added before the pressure mixing step may comprise liquids of flowable materials selected to provide specific properties or processing ability to the fiber mass. For example, lipids may be added to provide water repellency to the composition, and photopolymerizable compositions may be used to form rapidly curable structural elements. By the appropriate selection of the added liquid, the environmental acceptability of the end product may be controlled to the point where, as with the addition of lipids such as coconut oil, the final product may be edible when dried into a film or structural member.

The highly refined cellulose fibers resulting from the process are also novel, as are the films and compositions containing these highly refined cellulose fibers.

DETAILED DESCRIPTION OF THE INVENTION

The process of the present invention involves simple but effective chemical and pressure mixing processes, such as homogenization operations. The process makes refined cellulose products from any cellulose source, including even minor amounts of wood fibers as additives, but more preferably from harvest residue crop fiber and other crop waste fiber sources such as silage, stalks, leaf (including tree leaves), and the like. The process has been extensively evaluated with respect to harvest residue from both sweet and yellow dent corn cobs and husks and soy hulls in our laboratory. After dewatering, the microfiber or microfibrillated or highly refined cellulose (HRC) formed a very hard solid material. Further investigation on the mechanical properties of molded samples indicated a potential for making materials similar to synthetic polymers that can be used in manufacturing industry. No reports have been found on using corn cobs and husks, whey, or other non-wood cellulose materials as starting materials to produce HRC. Furthermore, investigations into the properties of the HRC, and development of technology to convert it into products for end-use applications, will lead to greater utilization of crop by-products.

The process of the invention is for the formation of hardenable compositions and comprises:
  providing a composition comprising non-wood cellulose fiber,
  mechanically reducing the size of the cellulose fiber to less than 2 mm (or less than 1 mesh),
  reducing the binding effect of lignin on the microfiber content of the cellulose material (which is done by expanding the fibers into microfiber components, essentially breaking the binding action of the lignin on the microfibers, and/or by actually amount of lignin present in said composition comprising cellulose fiber) to form a first fiber product,
  providing pressure of at least 300 psi (or at least 500, 750, 1000, 2000 or more psi) to said first fiber product while it is in the presence of a liquid,
  removing said pressure within a time interval which will cause said cellulose fiber to break down into a second fiber product comprising microfibers in said liquid, and
  optionally hardening said second fiber product by removal of at least some of said liquid.

The process may reduce the amount of lignin by weight of solids in said first fiber product by any percent, but preferably reduces the amount of lignin by weight of solids in said first fiber product to less than 1.0%, more preferably less than 0.5% and most preferably to less than 0.25%, 0.10% or down to essentially 0.0%. The reduction in the amount of lignin is based upon controlling the relative ability of the fibers to be handled during subsequent processing. Larger amounts of lignin, such as the mid-range of about 6% by weight of fiber, found in corn cellulose fiber composition reduces the free moving action of individual fibers and subsequently the microfibers. The binding action and/or presence of lignin can reduce the surface expansion effect (e.g., the ratio of surface area after expansion as compared to the surface area before expansion) and reduce the ability of the microfibers to intertwine and entangle, and thus reduce the structural integrity and/or strength of the final product.

Reducing the amount of lignin may be performed by a process comprising treating said composition comprising cellulose fiber with alkali metal hydroxide (e.g., aqueous sodium hydroxide) at temperatures between 40 and 110° C., preferably between 60 and 110° C., and more preferably between 80 and 105° C., with 100° C. being the presently practiced operating temperature, or by an alcohol cooking system using 50% aqueous ethanol cookin at 185° C. for 30 to 60 minutes.

It is preferred that the composition comprising cellulose fiber comprises at least 25% by weight of non-wood fiber as compared to the weight of all fiber in said composition. Wood fiber does not perform nearly as well as large cell-fiber materials available from other plants, particularly the agricultural residues of digestible products. It is preferred that the composition comprises at least 50%, more preferably at least 75%, still more preferably at least 85 or at least 95% non-wood cellulose fiber and most preferably 100%.

The resulting fiber products of the process are termed "highly refined fibers" in the practice of the present invention. These fibers may be clearly distinguished from the fine fibers produced by alternative technology discussed above. For example, with the milling of cellulose fibers, internal surface area reaches approximately 1.0 $m^2/g$ with very fine milled fibers. According to the practice of the present invention, the internal surface area (as measured by total gas adsorption to the fiber, as measured by a particle analyzer, such as a Micrometric particle analyzer, which measures internal surface area, pore size, and material composition) is greater than 5.0 $m^2/g$, can be greater than 7.0 $m^2/g$, is usually greater than 10.0 and greater than 15 or 20 $m^2/g$, and in the actual examples herein is shown at levels of 40 or more $m^2/g$. The term "highly refined, non-wood cellulose fiber" as used in the practice of the present invention requires that the fiber display an internal surface area of at least 50 $m^2/g$ when measured by these appropriate techniques.

The process is preferably performed for certain types of ultimate products (such as molded products) where the pressure in step d) is at least 3,000 psi, more preferably at least 4,000 psi, and is most preferably performed at pressures of 5,000 psi, or higher. In an homogenization process, said composition is mixed while under said pressure.

A preferred process for the formation of hardenable compositions comprises:

providing a composition comprising cellulose fiber from at least one plant selected from the group consisting of corn, soy, wheat, whey, peanuts, straw, hay, leaves (from trees), beet pulp, and beets, mechanically reducing the size of the cellulose fiber to less than 30 mesh, reducing the amount of lignin present in said composition comprising cellulose fiber to form a first fiber product, providing pressure of at least 2000 psi to said first fiber product while it is in the presence of a liquid, reducing said pressure within a time interval which will cause said cellulose fiber to break down into a second fiber product comprising microfibers in said liquid, and hardening said second fiber product by removal of at least some of said liquid.

A still more preferred process would be where said liquid in step d) is a lipid (e.g., vegetable or fruit oils such as coconut oil, safflower oil, canola oil, soy oil, corn oil, linseed oil, and peanut oil), waxes such as beeswax, carnauba wax, microcrystalline wax, other synthetic waxes, biodegradable polymers (e.g., especially for molding operations) such as amylopectin, gelatin, polycaprolactones, resins, gums, polysaccharides, and other fiber material from agricultural products other than tree trunks, bark and limbs, but possibly including leaves as a major component (e.g., non-wood), and particularly from agricultural waste materials from processing such as whey, beet pulp, residue from brewing and processing and separation techniques, and said reducing said pressure causes rapid rupturing of cell walls in said fiber and breaks said fiber down into microfibers. When the term "comprising non-wood fiber" is used, the cellulose fiber composition must contain at least fiber significant amount of fiber other than wood based fiber (e.g., at least 10% by weight, at least 20% by weight, at least 40% by weight, preferably at least 50% or at least 60% by weight, more preferably at least 70% or 80% by weight, and most preferably at least 90% or 95% by weight up to 100% by weight of non-wood fiber). Other diluents besides wood fiber may be present to modify the physical properties of the composition, but the composition must comprise non-wood fiber.

The invention also includes a coating composition comprising a suspension or dispersion of highly refined non-wood cellulose fiber. The coating composition may comprise a suspension or dispersion of highly refined non-wood cellulose fiber and a thickening agent, such as starch, polysaccharides, natural and synthetic gums and resins, water-binding agents, silica, acrylic resins, polyvinylpyrrolidone, polyvinyl alcohol, and the like. Digestible and/or biodegradable materials are preferred as the thickeners. The coating solution may be in an aqueous or organic solution. The coating solution may be a dispersion or suspension in a lipid, and the lipid may selected from fruit, vegetable or grain oils.

The invention also includes a film comprising entangled microfibers comprising non-wood cellulose microfibers having a tensile strength of at least 40 MPa, oxygen permeability of no more than 3.0 fl.m/Pa.s.m$^2$, and water permeability of no more than $6.3 \times 10^{-10}$ g.m/Pa.s.m$^2$. The film may comprise said entangled microfibers and oil. The film may also comprise said entangled microfibers and lipids. The film may alternatively comprise said entangled microfibers and additional edible material.

The invention also comprises an edible article comprising material having nutritional value coated, wrapped or coated and wrapped with a film or coating as previously described. The invention also includes a layer comprising entangled cellulose, non-wood microfibers forming a foraminous matrix, interstices of said matrix containing a material selected from the class of lipids, polymers, polymerizable material, and solutions. The layer may have been molded, and it is preferred that said material is biodegradable and/or edible.

One capability of the process of this invention is to make 100% biodegradable cellulose-based materials from agricultural fibrous by-products, especially corn cobs and husks. An additional benefit is methods such as compression and injection molding to convert the above-mentioned materials into semi-finished and finished products for end-use by industries and consumers. The method converts raw fibrous materials such as corn cobs and husks into fibrous slurry; (ii) using pressure mixing, such as homogenization, to process the fibrous slurry into highly refined cellulose (HRC); and (iii) to make HRC into molded products for use by manufacturing industries and consumers. Our preliminary study also indicates that materials made using the proposed process can potentially replace many non-biodegradable materials that are being used for the manufacture of disposable containers, mechanical parts, boards, furniture, and construction materials, etc.

The highly microfibrillated cellulose has a gel-like appearance and pseudoplastic viscosity properties at 2% concentration in water. The water retention capacity and relative viscosity of 2% MFC dispersions can be used as a measure of the degree of homogenization or microfibrillation of a given wood cellulose pulp. Having the physical and chemical properties as mentioned above, MFC dispersions are a potential ingredient that can be used in foods and other customer products (Turbak et al., supra).

However, the potential of using the microfibrillation process to produce fibrillated or microfibrillated materials for uses by material industries rather than food and cosmetic industries has never been explored. U.S. Pat. No. 4,374,702 found that on dehydration or drying, MFC suspensions irreversibly lost their physical and chemical properties including their loose spongy or web-like structure and water retention capability. In contrast to those observations, it was observed that when we made HRC materials from corn cobs and husks and soy hulls using a procedure similar to the one described in that patent, that air-dried refined cellulosic crumbs displayed a very dense structure and extremely strong mechanical strength, suggesting that dehydration or drying rendered the refined cellulosic materials to a permanently collapsed structure, possibly attributed to the interlocking and interwinding of fibrils and micro-fibrils. Our invention shows that HRC can be made into mechanically strong materials through compression and injection molding, and that highly useful film and coating materials can be provided by simple air drying.

In one process variation, compression and injection molding were applied to the refined cellulosic materials, producing excellent molded samples. The mechanical tests on the molded samples demonstrated some potential end-use applications of HRC in industrial production of containers, packaging, wrap, film coatings for fruits and vegetables and other edible products, cutlery, plates, cups, pots, furniture, board and even some mechanical parts. Because of the tensile and mechanical strength of the product, conventional procedures such as printing and coating may be performed on the finished product, even in film form. This allows for edible products to be made with printing on the wrap, with the wrap itself being edible (and even flavored by inclusion of flavors into the fibrous material). Because of the water resistance of the materials, the wrap itself could be washed for sanitary purposes and the entire article, wrapper and all, eaten and digested.

The nature of the drying process used after formation of the highly refined, non-wood cellulose fibers of the present invention affect the properties of the final composition significantly. If the wet refined fiber is rapidly air dried or infrared dried with no compressive forces (e.g., less than 100 mm Hg, preferably less than 50 or less than 20 mm Hg), the product is a light powdery form of the refined fiber. If the wet refined fiber is cast and dried, it produces a film material. If the wet refined fiber is compressed (wet pressed), particularly at higher pressures, e.g., above 100 mm Hg or above 760 mm Hg, a rigid and strong product can be provided, even without the use of binders. The fibers themselves interlock to provide a strong material. The binder will assist in providing other desirable physical and chemical properties, if they are desired.

EXAMPLES

The following examples describe and enable in detail the methods and practice of the present invention.

Example 1

Preparation of Highly Refined Cellulose (HRC)

A flow chart developed during our preliminary research for making MFC suspensions from corn cobs and husks and soy hulls is shown in FIG. 1. A commercial homogenizer (Gaulin, CGD) will be used in the preparation of HRC. The purpose of shredding and grinding is to cut the raw materials into a size that is suitable for cooking and homogenization. Cooking in NaOH solution is designed to remove non-cellulose substances such as lignin, sugars, proteins, starch and colors, and to decompose the crude fibers to a flowable slurry. After rinsing, the slurry is passed through the homogenizer. Upon rapid release of this pressure, by exiting the homogenization chamber, the fibers of the corn source are exploded. A highly refined suspension is obtained. The gross fiber structure is broken down into the component microfibril structure which is readily visible at this point by microscopic techniques (see Example 11). Effects of degree of shredding, grinding, cooking (temperature, time and concentration of NaOH), and homogenization (pressure, temperature, and number of passes) on the chemical and physical properties of the suspensions and molded articles have been examined.

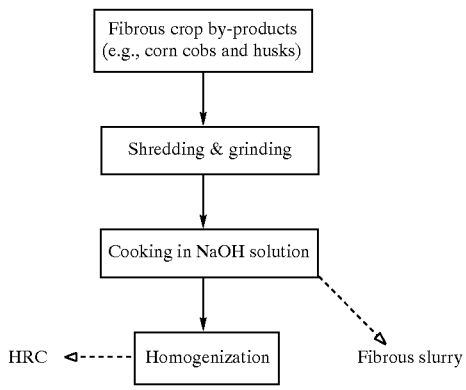

FIG. 1. Flowchart for preparation of HRC

Example 2

Preparation of HRC Containing Other Constituents

Other constituents can be co-homogenized with fiber slurry to produce various HRC based compositions for different purposes, for example, making edible films and coatings, or making molded articles.

Agricultural waste material in the form of sweet corn husks were ground dry to 60 mesh size. The resultant fiber product was washed in water. The washed, ground fiber was then transferred to an autoclave after mixing with a 2% sodium hydroxide solution. The fibers were cooked at 100° C. for 2 hours at 30 psi. After the autoclaving, the fiber product was washed in water to remove the alkali, then it was bleached with a hydrogen peroxide solution (30%) at 80° C. The resulting bleached fiber product was dilute with water to 1:100, solids:water. At this point a number of alternatives may be performed. Preferably other polysaccharides (various gums), lipids (e.g., coconut oil) or plasticizer (e.g., polyethylene glycol), proteins (whey proteins) may be added for the purpose of making edible films and coatings. Plasticizers, polymer solutions, suspensions or dispersions, or polymerizable or curable compositions can be co-homogenized to produce compositions for making molded articles. The fiber slurry containing other constituents may at this point be directly mechanically pulverized. The mechanical pulverization has been most successfully performed by homogenization at a pressure of 5000 psi.

Example 3

Dewatering of HRC Suspensions

It is preferred that some water is removed from HRC prior to molding or for the purpose of reducing the bulk volume and weight before shipment. However, the degree of hydration of HRC not only influences the molding operation, but also has a direct impact on the properties of HRC. Most of the water will be removed using a centrifugation process. Other dewatering techniques such as ultrasonic and pressure filtration methods may also be used. The level of moisture within dried HRC has a significant parameter affecting the molding process and the quality of the molded HRC.

Example 4

Making Edible Films and Coatings HRC Compositions

HRC compositions contain lipids, proteins, polysaccharides, and plasticizers of various concentrations were made from the process described in Example 2. The levels of lipids, proteins, plasticizers and saccharides added to the HRC were varied in ranges olf from 0 to 50% on a dry weight basis of the HRC. Amounts of from 1 to 50% could be used to adjust the properties of the HRC product significantly. To make a sheet of film, 30 ml HRC dispersion was cast into thin layer in a flat plastic dish with a diameter of 12.7 cm, and allowed to dry at room temperature overnight or at 70° C. in an oven for 4 hours.

Example 5

Coating of Seeds

With the proper selection of diluent or binder to the highly refined fiber mass, the compositions could be spray-on coverings for seed-laying processes, particularly for road side grass seed applications. By use of biodegradable and even nutrient carrying film forming materials, present binders systems, tend to be synthetic polymers which are not as readily accepted into the natural ecosytem could be replaced.

Example 6

Compression and Injection Molding of HRC Compositions

Conventional compression and injection molding equipment was used. Operational parameters of the equipment were readily adjustable so that various experimental conditions can be achieved. Compression molding were done using an OTC compression molding machine (Owatonna Tool Co., Owatonna, Minn.). Injection molding were accomplished using a Boy 50M injection molding machine with a reciprocating screw (Boy Machines, Inc., Fernthal, Germany). The samples were molded using a standard dog bone shaped mold as per the specifications of ASTM test method D638, and a standard bar-shaped mold for the impact test, as per specification of ASTM test method D256.

PCL (polycaprolactone), a commonly used biodegradable polymer, was the major co-polymer blended into HRC for compression and injection molding. The ratios of PCL to HRC were varied to obtain molded products with different properties.

The molded products show a range of mechanical and chemical properties suitable for different end uses Example 7

Chemical and Physical Analysis of HRC Suspensions

The composition of HRC dispersions were determined using chemical methods (Nielsen, S. 1994. Introduction t o the Chemical Analysis of Foods. Boston, Jones and Bartlett Publishers). The stability and viscosity of the HRC dispersions were measured with the methods described by Mohsenin (1986) (Mohesinin, N. N. 1986. *Physical properties of plant and animal materials*. Gorden and Breach Science Publications. New York). Color measurement was carried out using a color imaging processing system.

Example 8

Mechanical Strength and Permeability Properties of Edible Films and Coatings

Tension testing was carried out on an Instron (Model 4206, Instron Engineering Corp., Canton, Mass.) according to ASTM Standard Method D 882-88 to measure the tensile strength. Data were done with Series IX Automated Materials Testing System, v6.05. Strips (2 cm×6 cm) were cut from the films for the tests.

Puncture tests (Gontard et al, 1994) were conducted with the TA.XT2 Texture Analyzer (Texture Technologies Corp. Scarsdale, N.Y./Stable Micro Systems, Godalming, Surrey, UK). Films were cut into 4 cm diameter discs and fixed in an annular ring clamp (3 cm diameter). A cylindrical probe (3 mm diameter) was moved perpendicularly to the film's surface at a constant speed (0.1 mm s$^{-1}$) till it puctured through the film. Force deformation curves were recorded and the strength (N) at the puncture point were used to determine the hardness of the film.

The relaxation curves were obtained for the evaluation of viscoelastic properties using a procedure similar to the one for puncture tests. However the probe traveling downward was stopped at 0.9 mm deformation and maintained at that position. The film was then allowed to relax. The force-time relaxation curves were recorded for 1 min following deformation. The parameter Y (12 min) was calculated as follows:

$$Y(1\ min) = (F_0 - F_1)/F_0$$

where $F_0$ and $F_1$ were the forces recorded initially and after 1 min relaxation respectively.

Water vapor permeability of the films was determined using Twing Albert cups described in ASTM-96. The films were positioned on top of the test cups with shiny side outward and was sealed by wax. The test cups containing calcium sulfate at 0% RH were placed in a desiccator cabinet at room temperature. Cups were weighed at the intervals of 1.5, 3.5, 7, 16, 25 hour. The water vapor transmission rate (WVTR) was calculated from a linear regression of the slope of weight gain vs time. Water vapor permeability (WVP) was calculated from the following equation:

$$WVP = WVTR \times (h/\Delta p)$$

where h was the mean thickness of film specimens; $\Delta p$ was the difference in partial water vapor pressure between two sides of film. The units in this paper was g-mm/kPa-h-m$^2$.

Example 9

Chemical, Physical and Mechanical Properties of Molded HRC

Changes in chemical composition of HRC after molding were monitored. The molded samples were evaluated for specific gravity, tensile strength, flexural strength and impact properties. The specific gravity was measured using the method describe by Mohsenin (1986). Tensile properties were determine d using ASTM test method D638. Impact strength will be measured using ASTM D790. Color measurements were carried out using a color imaging processing system.

Example 10

Molecular weight and Crystallinity of the Cellulose

Cellulose is a polymer of β-glucose with β-1-4 linkages between glucose units. The length of the molecules may break down when subjected to chemical hydrolysis or mechanical processes, which will be reflected in changes in molecular weight. The hydroxyl groups that protrude from the chain may readily form hydrogen bonds, resulting in a certain amount of crystallinity. The areas of crystallinity are more dense and more resistant to enzymes and chemical reagents than n on crystalline areas. The important features of crystallinity of cellulose concerned here are (i) crystalline areas of cellulose chain absorb water poorly; (ii) a high degree of crystallinity of cellulose results in a greatly increased elastic modulus and greater tensile strength. This should lead to greater mechanical strength of HRC. Crystallinity occurs in a cellulose material when moisture is removed from the material. This may happen to HRC when subjected to drying and molding. Therefore, measurement of crystallinity of HRC may lead to a better understanding of how HRC behaves in terms of its physical and mechanical properties which are strongly associated with its acceptability as a material for industrial uses.

Changes in crystallinity of HRC samples before and after drying and after injection molding was measured using a Siemens D-500 Diffractometer. Samples were measured using a method described in Ruan et al. (Ruan, R., Y. Lun, J. Zhang, P. Addis, and P. Chen. 1996. Structure-Function Relationships of Highly Refined Cellulose Made from Agricultural Fibrous Residues. *Applied Engineering in Agriculture*. 12(4):465–468.). The amount of water inside crystalline region was also accessed using NMR analyzer and related to the amount of crystallinity.

Example 11

Soaking Test

Natural microfibrils are water-insoluble. It has been demonstrated that the some molded HRC did not dissociate at all when soaked in water for months, while other molded materials dissociated in water after soaking for a few hours. In other words, cellulose in general has a very high water holding capacity. However, initial moisture content, dewatering and molding processes do affect the water absorption characteristics of the molded HRC products. Therefore, it is necessary to scientifically test the amount of water absorbed by various HRC products under different conditions (soaking time, temperature, etc.) since some processing conditions may loosen the structure and hence affect the chemical and mechanical properties of the material.

To study the water absorption properties of molded HRC, appropriate amounts of the material were carefully weighed and placed into a beaker containing distilled water. Three sets of samples were prepared to test water absorption characteristics at three different temperatures, namely 20, 50 and 100° C. In each set, five samples were prepared, each of which will be replicated 3 times, and samples were taken for examination on days 5, 10, 20, 40 and 60. Examinations included water absorption and distribution by nuclear magnetic resonance (Gagnaire et al., 1983; Vriesenga et al., 1983; Han et al., 1995) Gagnaire, D., Saint-Germain, J. and Vinvmfon, M. 1983. *J. Appl. Polymer Sci: Appl. Polymer Symposium*. 37, 261; Han, J., R. Ruan, and C. H. Park. 1995. Prediction of hydrogel pore size by pulse NMR and neural networks. *Biotechnology Techniques*. 9(9):637–642; Vriesenga, J. R., Chandrasekaran, S. and Luner, P. 1983. *J. Appl. Polymer Sci.: Appl. Polymer Symposium*. 37, 911. and magnetic resonance imaging (Ruan et al., 1992) Ruan, R., J. B. Litchfield, and S. R. Eckhoff. 1992. Simultaneous and nondestructive measurement of transient moisture profiles and structural changes in corn kernels during steeping using microscopic NMR imaging. *Cereal Chemistry*. 69(6):600–606, and mechanical properties by ASTM D638 and D790 methods. The water remaining in the beakers was tested for cellulose using the method described previously to determine if there was any leakage of cellulose from the molded samples into the water. Mathematical models were applied to the data obtained.

Example 12

Microscopy of Raw, HRC Suspensions and Molded HRC

Light and scanning electron microscopy were used to study the microstructures of raw materials, HRC suspensions and injection molded HRC. For light microscopy (LM), the samples were fixed with 5% gluteraldehyde solution, followed by dehydration using ethanol. This was followed by embedding in resin. Thin sections were obtained using a microtome. To observe the structure of fibers, fibrils and microfibrils, the thin sections were stained using toluidine blue in borax. The stained sections were observed under a light microscope and images captured by a camera. For scanning electron microscopy (SEM), samples were dehydrated with acetone and dried using a critical-point drying process, stuck on to sample stub and coated with gold/palladium alloy and observed by SEM. SEM images were recorded on pan roll films.

Ballmilled cellulose, crude cellulose slurry and highly refined cellulose may be distinguished in a number of ways. Although the particle sizes are similar (0.1, 0.2 and 0.2, respectively), the specific surface areas differ (e.g., 0.9, ~23, and >30, respectively), and the crystalline indices differ (e.g., ~1.62, ~1.37 and less than 1.25 [usually less than 1.15 and less than 1.05, e.g., 0.99], respectively.

What we claim:

1. A film comprising entangled microfibers comprising non-wood cellulose microfibers having a tensile strength of at least 40 MPa, gas permeability of no more than 3.0 fl.m/Pa.s.m$^2$, and water permeability of no more than 6.3× 10$^{-10}$ g.m/Pa.s.m$^2$.

2. The film of claim 1 comprising said entangled microfibers and at least one additional ingredient selected from the group consisting of oil, lipids, and edible material.

3. A film comprising material having nutritional value coated, wrapped or coated and wrapped with a film according to claim 1.

4. An edible article comprising material having nutritional value coated, wrapped or coated and wrapped with a film according to claim 2.

5. A layer comprising entangled highly refined cellulose, non-wood microfibers forming a foraminous matrix, interstices of said matrix containing a material selected from the class of lipids, polymers, polymerizable material, and solutions.

6. The layer of claim 5 wherein said layer has been molded.

7. The layer of claim 5 wherein said material is edible.

* * * * *

UNITED STATES PATENT AND TRADEMARK OFFICE
CERTIFICATE OF CORRECTION

PATENT NO.: 6,083,582

DATED: Jul. 4, 2000

INVENTOR(S): Chen et al.

It is certified that error appears in the above-identified patent and that said Letters Patent is hereby corrected as shown below:

In column 1, line 25, delete "by-products, much" and insert --by-products. Much--, therefor.

In column 2, lines 45-46, delete "(What format for listing cited literature?).".

In column 3, line 32, delete "package" and insert --packaging--, therefor.

In column 3, line 40, delete "prevent" and insert --protect--, therefor.

In column 3, line 52, insert a comma and a paragraph break after "foods".

In column 3, line 52, delete "suitable of" and insert --suitable for--, therefor.

In column 4, line 20, delete "deterioration," and insert --deterioration--, therefor.

In column 4, line 22, delete "migration," and insert --migration--, therefor.

In column 4, line 40, delete "compose" and insert --be composed--, therefor.

In column 4, line 41, insert --a-- after "or".

In column 4, line 57, delete "mostly" and insert --most--, therefor.

In column 4, line 57, insert --of-- after "because".

In column 5, line 65, delete "process, which" and insert --process. They--, therefor.

In column 6, line 33, delete "confectionery," and insert --confectionery--, therefor.

In column 6, line 37, delete "fillings," and insert --fillings--, therefor.

In column 6, line 41, delete "dessert," and insert --dessert--, therefor.

UNITED STATES PATENT AND TRADEMARK OFFICE
CERTIFICATE OF CORRECTION

PATENT NO.: 6,083,582

DATED: Jul. 4, 2000

INVENTOR(S): Chen et al.

It is certified that error appears in the above-identified patent and that said Letters Patent is hereby corrected as shown below:

In column 6, line 43, delete "pharmaceuticals," and insert --pharmaceuticals--, therefor.

In column 6, line 44, delete "confectionery," and insert --confectionery--, therefor.

In column 6, line 49, delete "attentions" and insert --attention--, therefor.

In column 6, line 51, delete "is" and insert --was--, therefor.

In column 6, line 54, delete "the concepts" and insert --were there concepts--, therefor.

In column 7, line 57, delete "1" and insert --10--, therefor.

In column 7, line 62, insert --reducing-- after "actually".

In column 8, line 16, delete "composition reduces" and insert --compositions, reduce--, therefor.

In column 9, line 34, insert --a-- after "least".

In column 9, line 56, insert --be-- after "may".

In column 9, line 61, delete "fl.m/Pa.s.m$^2$" and insert --fl·m/Pa·s·m$^2$--, therefor.

In column 9, line 62, delete "g.m/Pa.s.m$^2$" and insert --g·m/Pa·s·m$^2$--, therefor.

In column 12, line 36, delete "dilute" and insert --diluted--, therefor.

In column 12, line 39, delete "plasticizer" and insert --plasticizers--, therefor.

In column 12, line 64, insert --of-- after "coatings".

UNITED STATES PATENT AND TRADEMARK OFFICE
CERTIFICATE OF CORRECTION

PATENT NO.: 6,083,582

DATED: Jul. 4, 2000

INVENTOR(S): Chen et al.

It is certified that error appears in the above-identified patent and that said Letters Patent is hereby corrected as shown below:

In column 12, line 66, delete "contain" and insert --containing--, therefor.

In column 13, line 3, delete "olf" and insert --of--, therefor.

In column 13, line 30, delete "were" and insert --was--, therefor.

In column 13, line 32, delete "were" and insert --was--, therefor.

In column 13, line 45, insert a period after "uses".

In column 13, line 53, delete "t o" and insert --to--, therefor.

In column 13, lines 56, delete "Mohesinin" and insert --Mohsenin--, therefor.

In column 14, line 5, delete "et al" and insert --et al.--, therefor.

In column 14, line 6, insert a comma after "Corp.".

In column 14, line 11, delete "puctured" and insert --punctured--, therefor.

In column 14, line 13, delete "were" and insert --was--, therefor.

In column 14, line 30, delete "was" and insert --were--, therefor.

In column 14, line 33, insert --and-- after "16,".

In column 14, line 33, delete "hour" and insert --hours--, therefor.

In column 14, line 35, delete "vs" and insert --vs.--, therefor.

In column 14, line 52, delete "describe" and insert --described--, therefor.

UNITED STATES PATENT AND TRADEMARK OFFICE
CERTIFICATE OF CORRECTION

PATENT NO.: 6,083,582

DATED: Jul. 4, 2000

INVENTOR(S) : Chen et al.

It is certified that error appears in the above-identified patent and that said Letters Patent is hereby corrected as shown below:

In column 14, line 53, delete "determine d" and insert --determined--, therefor.

In column 15, line 2, delete "n on" and insert --non--, therefor.

In column 15, line 3, insert --that-- after "are".

In column 15, line 22, insert --the-- after "inside".

In column 15, line 23, insert --an-- after "using".

In column 15, line 49, delete "will be" and insert --was--, therefor.

In column 16, line 36, delete "respectively." and insert --respectively.)--, therefor.

In column 16, line 41, delete "fl.m/Pa.s.m$^2$" and insert --fl·m/Pa·s·m$^2$--, therefor.

In column 16, line 42, delete "g.m/Pa.s.m$^2$" and insert --g·m/Pa·s·m$^2$--, therefor.

Signed and Sealed this

Eighth Day of May, 2001

Attest:

NICHOLAS P. GODICI

Attesting Officer

Acting Director of the United States Patent and Trademark Office

UNITED STATES PATENT AND TRADEMARK OFFICE
CERTIFICATE OF CORRECTION

PATENT NO.    : 6,083,582
DATED         : July 4, 2000
INVENTOR(S)   : Chen et al.

It is certified that error appears in the above-identified patent and that said Letters Patent is hereby corrected as shown below:

Title page,
Item [73], in the Assignee field add: -- Agricultural Utilization Research Institute, Waseca, MN --.

Column 1,
Line 25, delete "by-products, much" and insert -- by-products. Much --, therefor.

Column 2,
Lines 45-46, delete "(What format for listing cited literature?).".

Column 3,
Line 32, delete "package" and insert -- packaging --, therefor.
Line 40, delete "prevent" and insert -- protect --, therefor.
Line 52, insert a comma and a paragraph break after "foods".
Line 52, delete "suitable of" and insert -- suitable for --, therefor.

Column 4,
Line 20, delete "deterioration," and insert -- deterioration --, therefor.
Line 22, delete "migration," and insert -- migration --, therefor.
Line 40, delete "compose" and insert -- be composed --, therefor.
Line 41, insert -- a -- after "or".
Line 57, delete "mostly" and insert -- most --, therefor.
Line 57, insert -- of -- after "because".

Column 5,
Line 65, delete "process, which" and insert -- process. They --, therefor.

Column 6,
Line 33, delete "confectionery," and insert -- confectionery --, therefor.
Line 37, delete "fillings," and insert -- fillings --, therefor.
Line 41, delete "dessert," and insert -- dessert --, therefor.
Line 43, delete "pharmaceuticals," and insert -- pharmaceuticals --, therefor.
Line 44, delete "confectionery," and insert -- confectionery --, therefor.
Line 49, delete "attentions" and insert -- attention --, therefor.
Line 51, delete "is" and insert -- was --, therefor.
Line 53, delete "the concepts" and insert -- were there concepts --, therefor.

UNITED STATES PATENT AND TRADEMARK OFFICE
CERTIFICATE OF CORRECTION

PATENT NO.     : 6,083,582
DATED          : July 4, 2000
INVENTOR(S)    : Chen et al.

It is certified that error appears in the above-identified patent and that said Letters Patent is hereby corrected as shown below:

Column 7,
Line 57, delete "1" and insert -- 10 --, therefor.
Line 62, insert -- reducing -- after "actually".

Column 8,
Line 16, delete "composition reduces" and insert -- compositions, reduce --, therefor.

Column 9,
Line 34, insert -- a -- after "least".
Line 56, insert -- be -- after "may".
Line 61, delete "fl.m/Pa.s.m$^2$" and insert -- fl·m/Pa·s·m$^2$ --, therefor.
Line 62, delete "g.m/Pa.s.m$^2$" and insert -- g·m/Pa·s·m$^2$ --, therefor.

Column 12,
Line 36, delete "dilute" and insert -- diluted --, therefor.
Line 39, delete "plasticizer" and insert -- plasticizers --, therefor.
Line 64, insert -- of -- after "coatings".
Line 66, delete "contain" and insert -- containing --, therefor.

Column 13,
Line 3, delete "olf" and insert -- of --, therefor.
Line 30, delete "were" and insert -- was --, therefor.
Line 32, delete "were" and insert -- was --, therefor.
Line 45, insert a period after "uses".
Line 53, delete "t o" and insert -- to --, therefor.
Line 56, delete "Mohesinin" and insert -- Mohsenin --, therefor.

Column 14,
Line 5, delete "et al" and insert -- et al. --, therefor.
Line 6, insert a comma after "Corp.".
Line 11, delete "puctured" and insert -- punctured --, therefor.
Line 13, delete "were" and insert -- was --, therefor.
Line 30, delete "was" and insert -- were --, therefor.
Line 33, insert -- and -- after "16,".
Line 33, delete "hour" and insert -- hours --, therefor.
Line 35, delete "vs" and insert -- vs. --, therefor.
Line 52, delete "describe" and insert -- described --, therefor.
Line 53, delete "determine d" and insert -- determined --, therefor.

UNITED STATES PATENT AND TRADEMARK OFFICE
CERTIFICATE OF CORRECTION

PATENT NO.   : 6,083,582
DATED        : July 4, 2000
INVENTOR(S)  : Chen et al.

It is certified that error appears in the above-identified patent and that said Letters Patent is hereby corrected as shown below:

Column 15,
Line 2, delete "n on" and insert -- non --, therefor.
Line 3, insert -- that -- after "are".
Line 22, insert -- the -- after "inside".
Line 23, insert -- an -- after "using".
Line 49, delete "will be" and insert -- was --, therefor.

Column 16,
Line 36, delete "respectively." and insert -- respectively.) --, therefor.
Line 41, delete "fl.m/Pa.s.m$^2$" and insert -- fl·m/Pa·s·m$^2$ --, therefor.
Line 42, delete "g.m/Pa.s.m$^2$" and insert -- g·m/Pa·s·m$^2$ --, therefor.

Signed and Sealed this

Twentieth Day of August, 2002

Attest:

JAMES E. ROGAN
*Attesting Officer*     *Director of the United States Patent and Trademark Office*